US012586949B2

(12) United States Patent
Tanaka et al.

(10) Patent No.: US 12,586,949 B2
(45) Date of Patent: Mar. 24, 2026

(54) CASE FORMING MEMBER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shinji Tanaka, Mie (JP); Yutaka Kobayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 469 days.

(21) Appl. No.: 18/029,031

(22) PCT Filed: Aug. 3, 2021

(86) PCT No.: PCT/JP2021/028724

§ 371 (c)(1),
(2) Date: Aug. 10, 2023

(87) PCT Pub. No.: WO2022/079981

PCT Pub. Date: Apr. 21, 2022

(65) Prior Publication Data

US 2024/0243510 A1 Jul. 18, 2024

(30) Foreign Application Priority Data

Oct. 13, 2020 (JP) ................................ 2020-172278

(51) Int. Cl.

| | |
|---|---|
| ***H01R 13/512*** | (2006.01) |
| ***H01R 13/6591*** | (2011.01) |
| ***H01R 24/38*** | (2011.01) |

(52) U.S. Cl.

CPC ....... *H01R 13/512* (2013.01); *H01R 13/6591* (2013.01); *H01R 24/38* (2013.01)

(58) Field of Classification Search

CPC .. H01R 13/512; H01R 13/6591; H01R 24/38; H05K 9/0018; H04N 23/51

See application file for complete search history.

(56) References Cited

U.S. PATENT DOCUMENTS

2002/0101041 A1* 8/2002 Kameyama .......... H01R 13/521 277/628
2008/0188119 A1 8/2008 Okamura et al.

(Continued)

FOREIGN PATENT DOCUMENTS

| | | | |
|---|---|---|---|
| EP | 3264535 | A1 | 1/2018 |
| JP | 2018-045792 | A | 3/2018 |
| JP | 2020-047369 | A | 3/2020 |

OTHER PUBLICATIONS

Machine Translation JP 2018045792, (dated Mar. 22, 2018) (Year: 2025).*

(Continued)

*Primary Examiner* — Travis S Chambers
(74) *Attorney, Agent, or Firm* — Venjuris, P.C.

(57) ABSTRACT

A case forming member forms a shield case by being conductively mounted on an opening of a box-shaped accommodating member made of metal and is provided with a cover-side shield connector including a cover-side outer conductor and a cover for covering the opening. The cover is configured by uniting a plate-like electrically conductive member, which is made of metal and includes a plate-like shield portion fixable to the accommodating member to (Continued)

cover the opening and a connecting portion connected to the cover-side outer conductor, and a housing, which is made of synthetic resin and includes a holding portion for holding the cover-side shield connector and a plate-like exterior portion to be overlapped on an outer surface of the shield portion. A plate thickness of the exterior portion is larger than a plate thickness of the shield portion in a covering portion where the shield portion and the exterior portion overlap.

7 Claims, 7 Drawing Sheets

(56) References Cited

U.S. PATENT DOCUMENTS

| | | | | |
|---|---|---|---|---|
| 2011/0045693 | A1* | 2/2011 | Uchida | H01R 13/6585 439/567 |
| 2011/0096524 | A1 | 4/2011 | Kameyama | |
| 2015/0029337 | A1 | 1/2015 | Uchiyama et al. | |
| 2019/0052029 | A1* | 2/2019 | Hayasaka | H01R 13/6596 |
| 2020/0099168 | A1 | 3/2020 | Inoue et al. | |

OTHER PUBLICATIONS

Machine Translation JP 2020047369 A, (dated Mar. 26, 2020) (Year: 2025).*
International Search Report issued on Oct. 26, 2021 for WO 2022/079981 A1 (4 pages).

* cited by examiner

CASE FORMING MEMBER

CROSS REFERENCE TO RELATED APPLICATIONS

This application is a national phase of PCT application No. PCT/JP2021/028724, filed on Aug. 3, 2021, which claims priority from Japanese patent application No. 2020-172278, filed on Oct. 13, 2020, all of which are incorporated herein by reference.

TECHNICAL FIELD

The present disclosure relates to a case forming member.

BACKGROUND

Patent Document 1 discloses a camera device in which a circuit board, a lens portion and a connector are mounted in a camera case. The camera case is configured by assembling a box-like front case having the lens portion mounted therein and a rear case having the connector mounted therein. The circuit board and an imaging element are accommodated in the camera case.

PRIOR ART DOCUMENT

Patent Document

Patent Document 1: JP 2016-162556 A

SUMMARY OF THE INVENTION

Problems to be Solved

To shield the circuit board and the imaging element, the camera case needs to be made of metal. In view of ensuring the strength of the camera case, the camera case is preferably formed by die casting or cutting. However, since the shape of the connector is relatively complicated, a part for holding the connector, out of the rear case, is preferably made of synthetic resin.

As a countermeasure against this, the rear case is thought to have a structure in which a metal member for closing an opening of the front case and a resin member for holding the connector are united. However, if a covering portion for closing the opening of the front case has a double-layer structure of metal and resin, a thickness of the covering portion increases, thereby causing a problem that the entire device is enlarged.

A case forming member of the present disclosure was completed on the basis of the above situation and aims to realize miniaturization.

Means to Solve the Problem

A case forming member of the present disclosure forms a shield case by being conductively mounted on an opening of a box-shaped accommodating member made of metal and is provided with a shield connector including an outer conductor and a cover for covering the opening, the cover being configured by uniting a plate-like electrically conductive member made of metal and a housing made of synthetic resin, the plate-like electrically conductive member including a plate-like shield portion fixable to the accommodating member to cover the opening and a connecting portion connected to the outer conductor, the housing including a holding portion for holding the shield connector and a plate-like exterior portion to be overlapped on an outer surface of the plate-like shield portion, and a plate thickness of the plate-like exterior portion being larger than a plate thickness of the plate-like shield portion in a covering portion, the plate-like shield portion and the plate-like exterior portion overlapping in the covering portion.

Effect of the Invention

According to the present disclosure, miniaturization may be implemented.

DETAILED DESCRIPTION TO EXECUTE THE INVENTION

Description of Embodiments of Present Disclosure

Figure 1:
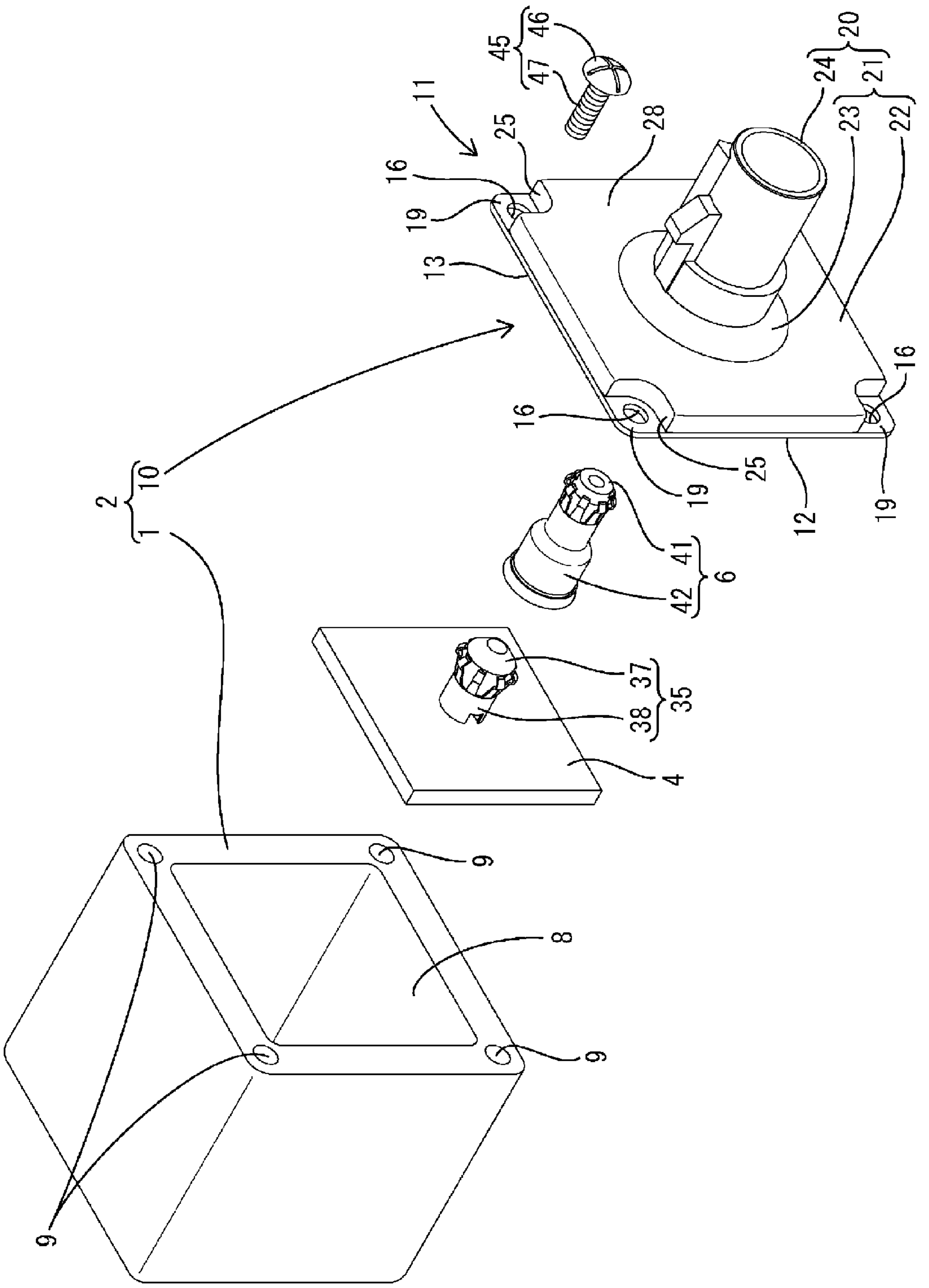
FIG. 1 is a perspective view showing a state where a case forming member of a first embodiment and an accommodating member are separated.

First, embodiments of the present disclosure are listed and described.

(1) The case forming member of the present disclosure forms a shield case by being conductively mounted on an opening of a box-shaped accommodating member made of metal and is provided with a shield connector including an outer conductor and a cover for covering the opening, the cover being configured by uniting a plate-like electrically conductive member made of metal and a housing made of synthetic resin, the plate-like electrically conductive member including a plate-like shield portion fixable to the accommodating member to cover the opening and a connecting portion connected to the outer conductor, the housing including a holding portion for holding the shield connector and a plate-like exterior portion to be overlapped on an outer surface of the plate-like shield portion, and a plate thickness of the plate-like exterior portion being larger than a plate thickness of the plate-like shield portion in a covering portion, the plate-like shield portion and the plate-like exterior portion overlapping in the covering portion. According to the configuration of the present disclosure, even if the plate-like shield portion is thin, the covering portion has sufficient rigidity due to the plate-like exterior portion having a large thickness. Since the plate-like shield portion needs not be thick in the case forming member of the present disclosure, the thickness of the covering portion can be reduced as compared to the case where the thickness of the plate-like shield portion is equal to or larger than that of the plate-like exterior portion. Therefore, the case forming member of the present disclosure can be miniaturized.

(2) Preferably, the plate-like shield portion is fixed to the accommodating member by a bolt passed through the plate-like shield portion from an outer surface side of the plate-like shield portion, and the plate-like exterior portion is formed with a cut portion for avoiding contact with a head portion of the bolt. According to this configuration, since a fastening force of the bolt does not reach the plate-like exterior portion made of synthetic resin and the plate-like shield portion is sandwiched between the accommodating member and a head portion of the bolt, the cover can be reliably fixed to the accommodating member.

(3) Preferably, in (2), the cut portion is formed by cutting only a part of an outer peripheral edge part of the plate-like exterior portion, and the outer peripheral edge part of the plate-like exterior portion is overlapped on an entire region where the cut portion is not formed, out of an outer peripheral edge part of the plate-like shield portion. According to this configuration, since a maximum area of the plate-like exterior portion can be secured within a range in which the plate-like exterior portion does not interfere with the head portion of the bolt, the rigidity of the covering portion obtained by the plate-like exterior portion can be sufficiently enhanced.

(4) Preferably, a projection of the plate-like exterior portion is accommodated and retained in a locking hole of the plate-like shield portion. According to this configuration, the plate-like shield portion and the plate-like exterior portion can be held in an overlapping state.

(5) Preferably, in (4), the plate-like shield portion is formed with a tubular protrusion projecting toward the plate-like exterior portion, and a center hole of the tubular protrusion functions as the locking hole. According to this configuration, since the tubular protrusion bites into the inside of the plate-like exterior portion, the plate-like shield portion and the plate-like exterior portion can be more reliably held in the overlapping state.

(6) Preferably, in (4) or (5), the plate-like shield portion and the plate-like exterior portion are rectangular, four corners of the rectangular plate-like shield portion serve as fixing portions to the accommodating member, and the locking hole and the projection are arranged on a diagonal connecting two diagonally located fixing portions. According to this configuration, a part along the diagonal connecting the two diagonally located fixing portions, out of the plate-like shield portion, is difficult to deform. Therefore, if the plate-like exterior portion is joined to the plate-like shield portion on the diagonal, the deformation of the plate-like exterior portion can be effectively suppressed.

(7) Preferably, the plate-like electrically conductive member includes a tubular connecting portion projecting from the plate-like shield portion and arranged along an inner peripheral surface of the holding portion, and the connecting portion and the outer conductor are resiliently in contact. According to this configuration, the plate-like electrically conductive member and the outer conductor can be conductively connected even without complicating the shape of the outer conductor of the shield connector.

Details of Embodiments of Present Disclosure

First Embodiment

Figure 2:
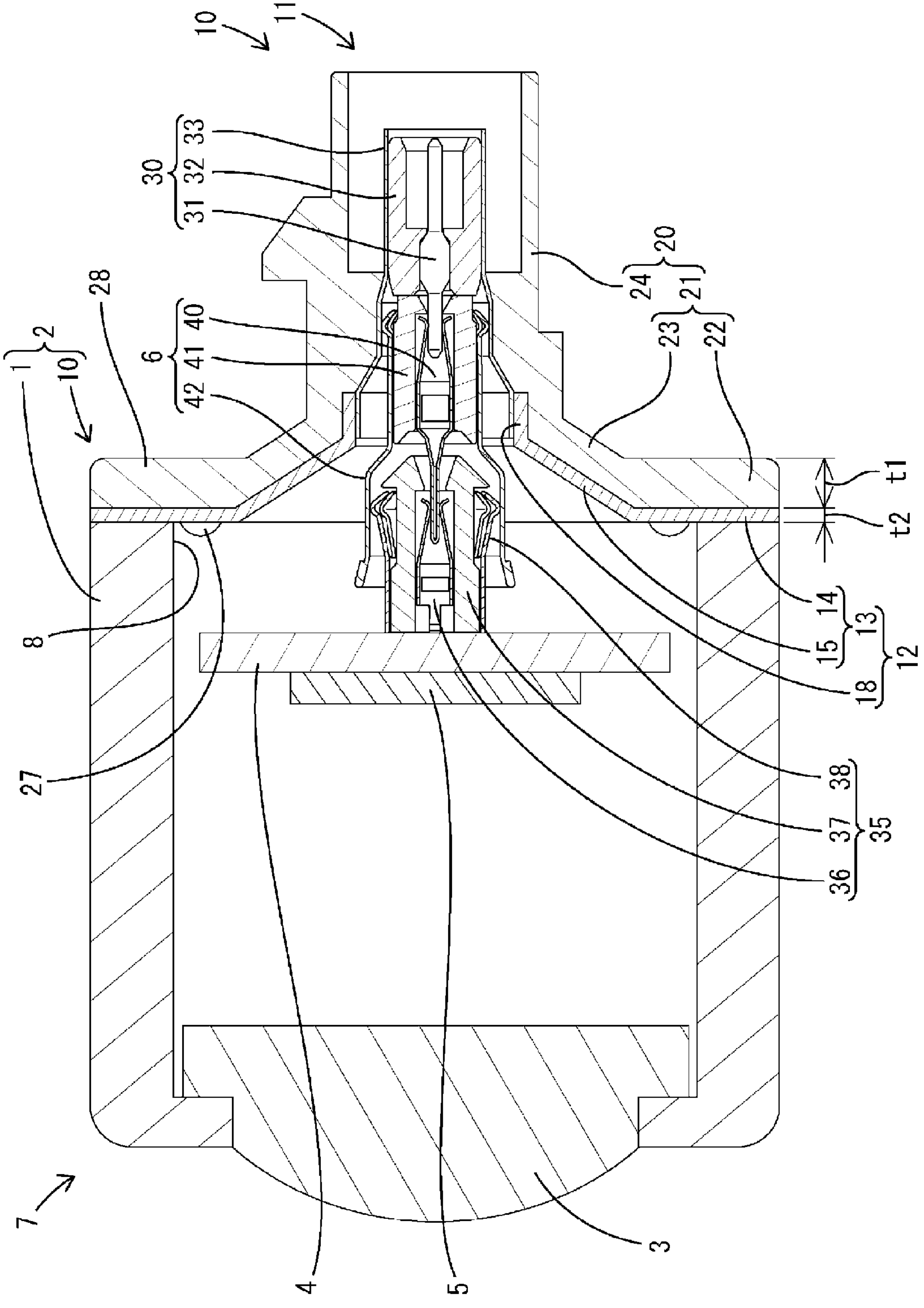
FIG. 2 is a side view in section showing a state where the case forming member and the accommodating member are assembled.
Figure 3:
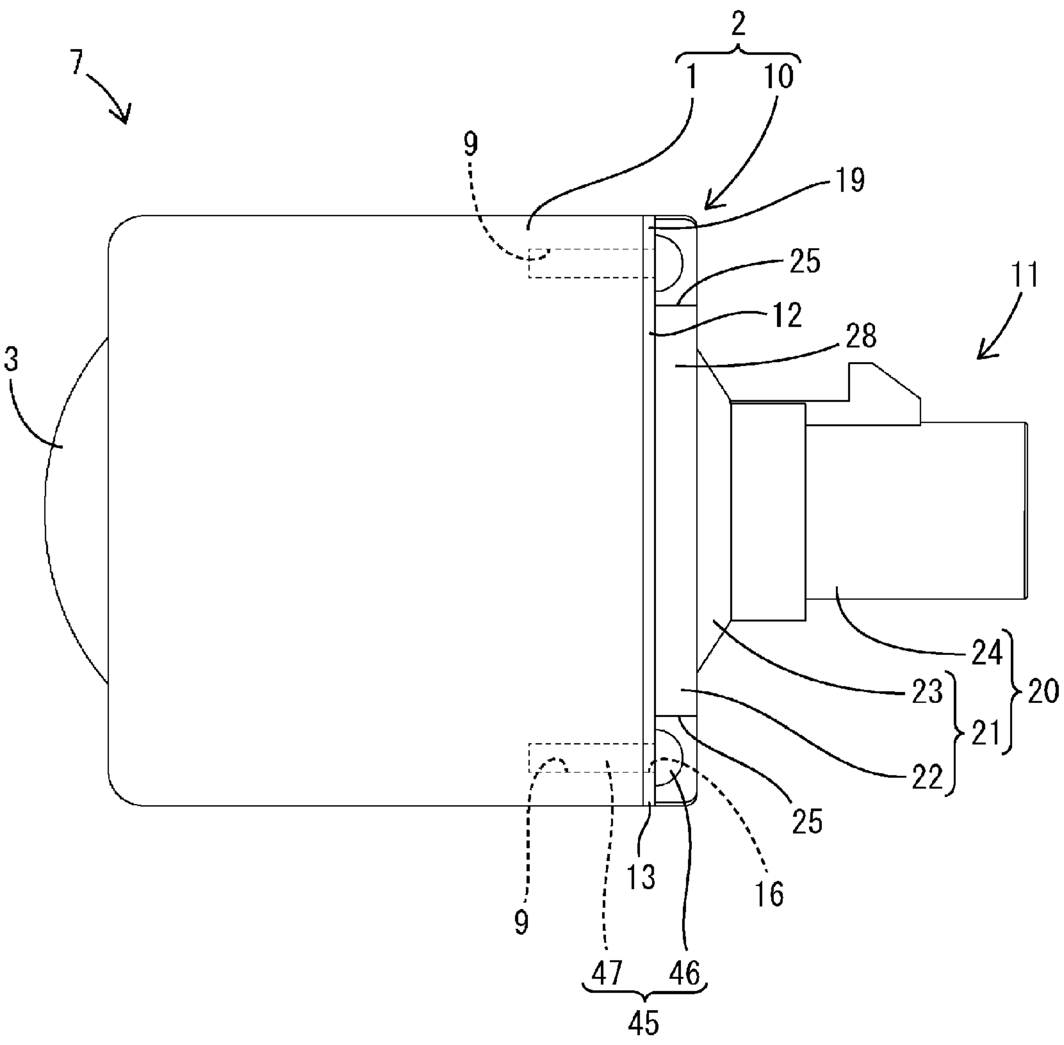
FIG. 3 is a side view showing the state where the case forming member and the accommodating member are assembled.
Figure 4:
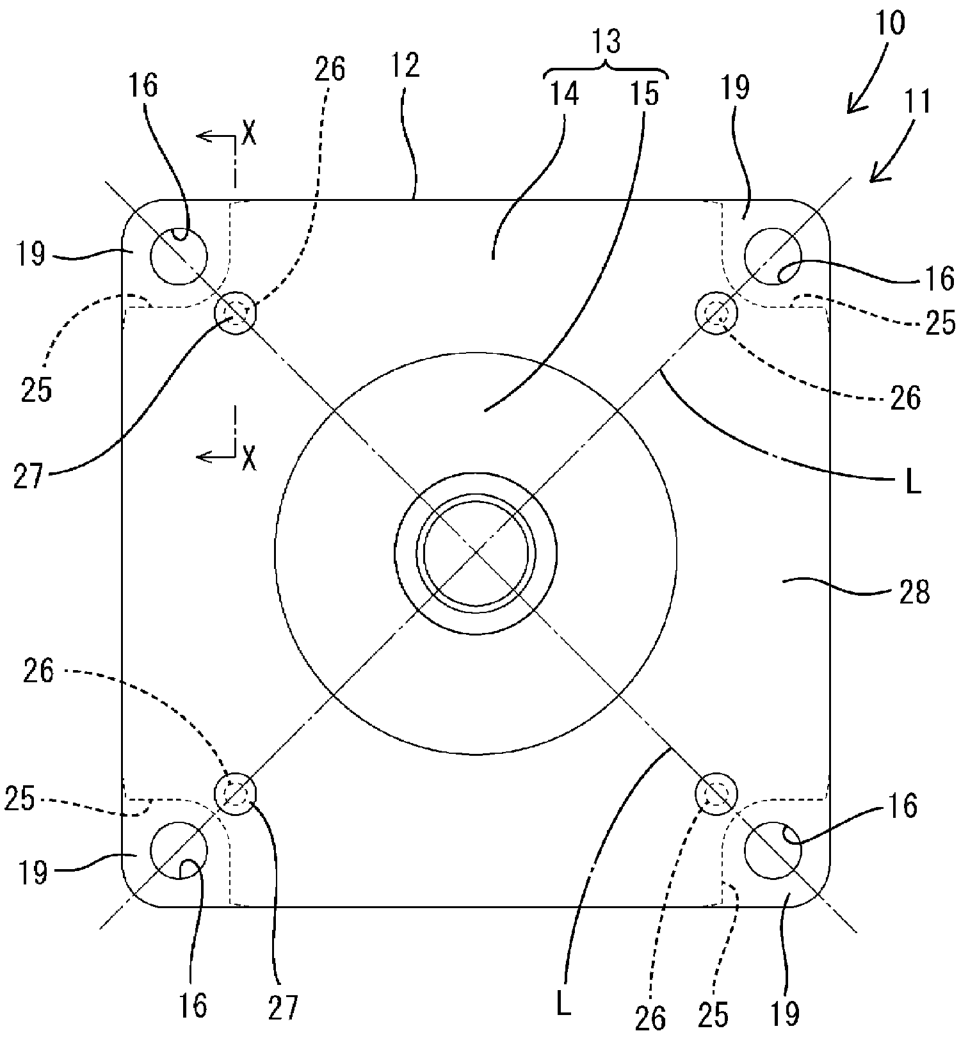
FIG. 4 is a front view of the case forming member.

A first specific embodiment of a case forming member of the present disclosure is described with reference to FIGS. 1 to 5. Note that the present invention is not limited to these illustrations, but is represented by claims and intended to include all changes in the scope of claims and in the meaning and scope of equivalents. In this embodiment, an oblique left-upper side in FIG. 1 and a left side in FIGS. 2 and 3 are defined as a front side concerning a front-rear direction. Upper and lower sides shown in FIGS. 1 to 5 are directly defined as upper and lower sides concerning a vertical direction. Left and right sides shown in FIG. 4 are directly defined as left and right sides concerning a lateral direction.

As shown in FIG. 1, a case forming member 10 of the first embodiment is a member for forming a shield case 2 by being mounted on an accommodating member 1. As shown in FIG. 2, a lens 3 is mounted in the shield case 2 and a circuit board 4, an imaging element 5 and an adapter 6 are accommodated in the shield case 21, whereby an in-vehicle camera device 7 is configured.

The accommodating member 1 is a box-shaped component having a rectangular parallelepiped shape with an entirely open rear surface. The accommodating member 1 is a single component made of a metal material and formed into a predetermined shape by die casting or cutting. The lens 3 is mounted in a mounting hole formed in a front wall part of the accommodating member 1. A square opening 8 is formed in the rear surface of the accommodating member 1. The accommodating member 1 is formed with four internally threaded holes 9 each having an axis oriented in the front-rear direction. The internally threaded holes 9 are open in an opening edge part surrounding the opening 8, out of the rear surface of the accommodating member 1. In a rear view of the accommodating member 1, the four internally threaded holes 9 are arranged at four corners of the opening edge part.

The circuit board 4 is fixedly provided at a predetermined position inside the accommodating member 1. A board-side shield connector 35 is mounted to project rearward on the rear surface of the circuit board 4. As shown in FIG. 2, the board-side shield connector 35 is formed by integrally assembling a board-side inner conductor 36, a board-side dielectric 37 surrounding the board-side inner conductor 36, and a board-side outer conductor 38 surrounding the board-side dielectric 37. The imaging element 5 is mounted on the front surface of the circuit board 4 to face the lens 3 in the front-rear direction.

The adapter 6 is formed by integrally assembling a movable-side inner conductor 40, a movable-side dielectric 41 surrounding the movable-side inner conductor 40 and a movable-side outer conductor 42 surrounding the movable-side dielectric 41. A front end part of the adapter 6 is mounted swingably in the vertical direction and lateral direction with respect to a rear end part of the board-side shield connector 35. With the adapter 6 mounted on the board-side shield connector 35, the movable-side inner conductor 40 is connected to the board-side inner conductor 36 and the inner peripheral surface of the movable-side outer conductor 42 is connected to the outer peripheral surface of the board-side outer conductor 38.

The case forming member 10 is mounted on a rear end part of the accommodating member 1 to cover an entire region of the opening 8. The case forming member 10 is configured by integrating a cover 11 and a cover-side shield connector 30. The cover 11 is configured by uniting a plate-like electrically conductive member 12 made of metal and a housing 20 made of synthetic resin.

The plate-like electrically conductive member 12 is a single press-formed component formed by applying stamping and burring to a metal plate material having a square outer shape and a fixed thickness. The plate-like electrically conductive member 12 includes a square plate-like shield portion 13 and a hollow cylindrical connecting portion 18 (see FIG. 2) arranged in a central part of the plate-like shield portion 13 in a front view of the plate-like electrically conductive member 12. One side of the plate-like shield portion 13 is equal in dimension to one side of the outer peripheral edge of the rear surface of the accommodating member 1.

The plate-like shield portion 13 includes a planar shield portion 14 having a plate thickness direction oriented in the front-rear direction and a tapered shield portion 15 having a truncated conical shape. The planar shield portion 14 constitutes a region except a central part of the plate-like shield portion 13. The tapered shield portion 15 is arranged in a central part of the planar shield portion 14 and projects rearward from the hole edge of a center hole of the planar shield portion 14 in such a manner as to reduce a diameter toward the rear. The connecting portion 18 projects coaxially rearward from a hole edge part of a center hole of the tapered shield portion 15. The connecting portion 18 is formed by burring.

Four circular through holes 16 aligned with the four internally threaded holes 9 are formed at four corners of the planar shield portion 14. The planar shield portion 14 is formed with four circular locking holes 17. As shown in FIG. 4, the four locking holes 17 are arranged on two diagonals L connecting two pairs of the through holes 16 in a diagonal positional relationship in a front view. On the diagonal L, the locking holes 17 are arranged at positions closer to the through holes 16 than to a center of the plate-like shield portion 13, i.e. arranged radially outwardly of the tapered shield portion 15.

The housing 20 is a single component made of synthetic resin and molded with a mold (not shown). The housing 20 includes a square plate-like exterior portion 21 and a tubular holding portion 24 arranged in a central part of the plate-like exterior portion 21 in a front view of the housing 20. One side of the plate-like exterior portion 21 is equal in dimension to one side of the outer peripheral edge of the rear surface of the accommodating member 1 and one side of the plate-like shield portion 13.

The plate-like exterior portion 21 includes a planar exterior portion 22 having a plate thickness direction oriented in the front-rear direction and a tapered exterior portion 23 having a truncated conical shape. The planar exterior portion 22 constitutes a region except a central part of the plate-like exterior portion 21. The tapered exterior portion 23 is arranged in a central part of the planar exterior portion 22 and projects rearward from the hole edge of a center hole of the planar exterior portion 22 in such a manner as to reduce a diameter toward the rear. As shown in FIG. 2, a plate thickness t1 of the plate-like exterior portion 21 in the front-rear direction is set to be larger than a plate thickness t2 of the plate-like shield portion 13. The holding portion 24 projects coaxially rearward from a hole edge part of a center hole of the tapered exterior portion 23.

Figure 5:
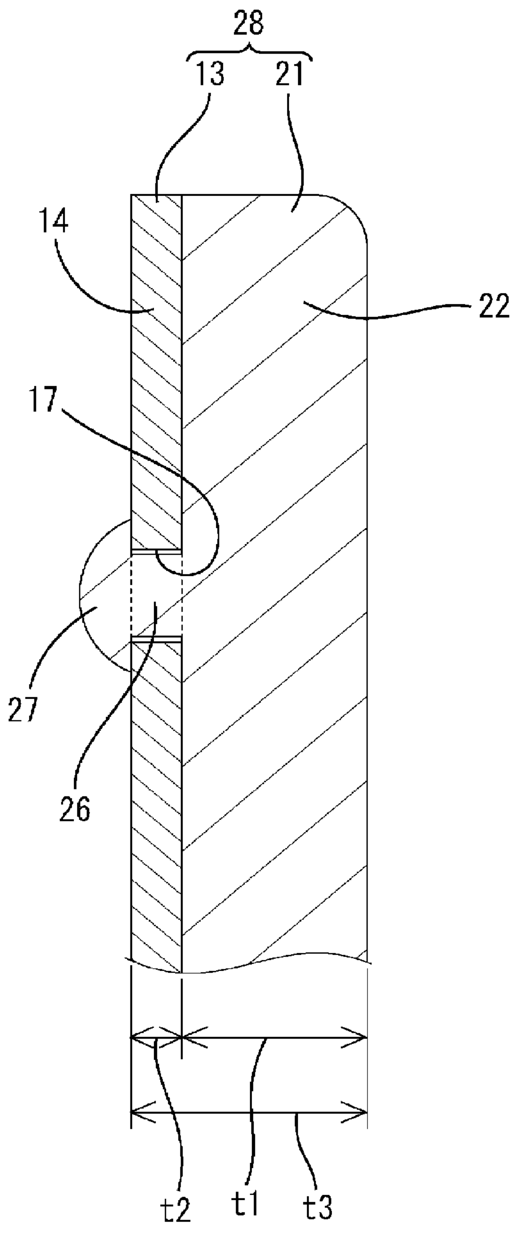
FIG. 5 is a section along X-X of FIG. 4.

Four cut portions 25 are formed at four corners of the planar exterior portion 22. The cut portions 25 are formed to avoid contact with head portions 46 of bolts 45 to be described later. The cut portions 25 are open in the outer peripheral surface, front surface and rear surface of the planar exterior portion 22. As shown in FIGS. 4 and 5, the planar exterior portion 22 is formed with four locking portions 26 in the form of cylindrical projections. The four cut portions 25 having a diagonal positional relationship in a front view are paired. The four locking portions 26 are arranged on two diagonals L connecting two pairs of the cut portions 25. These diagonals L coincide with the diagonals L connecting the through holes 16. On the diagonal L, the locking portions 26 are arranged at positions closer to the cut portions 25 than to a center of the plate-like exterior portion 21. In other words, the locking portions 26 are arranged at positions radially outward of the tapered exterior portion 23, i.e. at positions coaxial with the locking holes 17.

The plate-like electrically conductive member 12 and the housing 20 formed into the above shapes are assembled with the plate-like exterior portion 21 held in surface contact with and overlapping the rear surface (outer surface) of the plate-like shield portion 13. The rear surface of the planar shield portion 14 and the front surface of the planar exterior portion 22 are held in surface contact, and the rear surface of the tapered shield portion 15 and the front surface of the tapered exterior portion 23 are held in surface contact. The connecting portion 18 is press-fit into an inner wall portion of the holding portion 24. The locking portions 26 are press-fit into the locking holes 17, and tip parts of the locking portions 26 are plastically deformed to form retaining portions 27 having a larger diameter than the locking holes 17. The retaining portions 27 project from the front surface of the planar shield portion 14. The retaining portions 27 are locked to hole edge parts of the locking holes 17, whereby the plate-like shield portion 13 and the plate-like exterior portion 21 are held in a laminated state. In this way, the plate-like electrically conductive member 12 and the housing 20 are held in an assembled state and the cover 11 is configured.

A part where the plate-like shield portion 13 and the plate-like exterior portion 21 overlap, out of the case forming member 10, functions as a covering portion 28 for covering the opening 8 of the accommodating member 1. Parts not covered due to the cut portions 25, out of the plate-like shield portion 13, function as fixing portions 19 for fixing the plate-like electrically conductive member 12 (plate-like shield portion 13) of the cover 11. The fixing portion 19 is formed with the through hole 16. The rear surface of the fixing portion 19 is exposed to the outside of the cover 11 in the cut portion 25.

In the covering portion 28, an entire region where the cut portions 25 are not formed (entire region except the fixing portions 19), out of an outer peripheral edge part of the plate-like shield portion 13 (planar shield portion 14), is covered by an outer peripheral edge part of the plate-like exterior portion 21 (planar exterior portion 22). The holding portion 24 projects rearward from a central part of the rear surface of the covering portion 28. A harness-side shield connector (not shown) mounted on an end part of a wiring harness (not shown) is fit to a rear end part of the holding portion 24.

The cover-side shield connector 30 is assembled with the holding portion 24 of the cover 11 after the plate-like electrically conductive member 12 and the housing 20 are united. As shown in FIG. 2, the cover-side shield connector 30 is formed by integrally assembling a cover-side inner conductor 31, a cover-side dielectric 32 surrounding the cover-side inner conductor 31, and a cover-side outer conductor 33 surrounding the cover-side dielectric 32. In assembling the cover-side shield connector 30 with the housing 20, the cover-side shield connector 30 is press-fit into the holding portion 24 from the front of the housing 20.

Retaining projections (not shown) of the cover-side outer conductor 33 are caused to bite into the inner peripheral wall of the holding portion 24, whereby the cover-side shield connector 30 is held in a state assembled with the holding portion 24. The outer peripheral surface of a front end part of the cover-side outer conductor 33 resiliently contacts the inner peripheral surface of the connecting portion 18 of the plate-like electrically conductive member 12. By mounting the cover-side shield connector 30 in the cover 11, the assembling of the case forming member 10 is completed.

In mounting the case forming member 10 on the accommodating member 1, the opening 8 of the accommodating member 1 is covered with the cover 11. The outer peripheral edge part of the plate-like shield portion 13 is overlapped on the rear surface of the accommodating member 1, i.e. on the opening edge part of the opening 8, and the through holes 16 are aligned with the internally threaded holes 9. At this time, a ring-shaped waterproof packing (not shown) may be interposed between the front surface of the plate-like shield portion 13 and the rear surface of the accommodating member 1. The bolts 45 are inserted through the through holes 16 from behind the covering portion 28, and externally threaded portions 47 of the bolts 45 are fastened by being screwed into the internally threaded holes 9.

At this time, since the head portions 46 of the bolts 45 are located in spaces secured by the cut portions 25, the head portions 46 and the plate-like exterior portion 21 do not interfere with each other. The head portions 46 directly contact the rear surface of the plate-like shield portion 13, i.e. hole edge parts of the through holes 16, and the externally threaded portions 47 directly contact the inner peripheral walls of the internally threaded holes 9. Therefore, the plate-like electrically conductive member 12 and the accommodating member 1 are conductively connected. In this way, the case forming member 10 is assembled with the accommodating member 1 to configure the shield case 2. The inside of the shield case 2 is held in a shielded state by the accommodating member 1 and the plate-like electrically conductive member 12.

If the case forming member 10 is assembled with the accommodating member 1 by the bolts 45, a rear end part of the adapter 6 is connected to a front end part of the cover-side shield connector 30. Specifically, the cover-side inner conductor 31 is connected to the movable-side inner conductor 40, and the cover-side outer conductor 33 is connected to the movable-side outer conductor 42. The adapter 6 can be connected in a state inclined with respect to the cover-side shield connector 30. Therefore, even if the board-side shield connector 35 and the cover-side shield connector 30 are shifted in position in a direction (vertical direction or lateral direction) intersecting an approaching direction at the time of connecting the both shield connectors 30, 35, the both shield connectors 30, 35 are conductively connected via the adapter 6.

The case forming member 10 of the first embodiment forms the shield case 2 by being conductively mounted on the opening 8 of the box-shaped accommodating member 1 made of metal. The case forming member 10 is provided with the cover-side shield connector 30 including the cover-side outer conductor 33 and the cover 11 for covering the opening 8 of the accommodating member 1. The cover 11 is configured by uniting the plate-like electrically conductive member 12 made of metal and the housing 20 made of synthetic resin.

The plate-like electrically conductive member 12 includes the plate-like shield portion 13 fixable to the accommodating member 1 to cover the opening 8, and the connecting portion 18 connected to the outer conductor. The housing 20 includes the holding portion 24 for holding the cover-side shield connector 30 and the plate-like exterior portion 21 to be overlapped on the outer surface (rear surface) of the plate-like shield portion 13. In the covering portion 28 in which the plate-like shield portion 13 and the plate-like exterior portion 21 overlap, the plate thickness t1 of the plate-like exterior portion 21 is larger than the plate thickness t2 of the plate-like shield portion 13.

Accordingly, the plate thickness t2 of the entire plate-like electrically conductive member 12 including the plate-like shield portion 13 can be reduced, and the plate-like electrically conductive member 12 can be formed by press-working. Even if the plate-like shield portion 13 is thin, the covering portion 28 has sufficient rigidity due to the plate-like exterior portion 21 having a large thickness. Since the plate-like shield portion 13 needs not be thick in the case forming member 10 of the first embodiment, a thickness t3 of the covering portion 28 can be reduced as compared to the case where the thickness of the plate-like shield portion 13 is equal to or larger than that of the plate-like exterior portion 21. Therefore, the case forming member 10 of the first embodiment can be miniaturized.

The plate-like shield portion 13 is fixed to the accommodating member 1 by the bolts 45 passed through the plate-like shield portion 13 from an outer surface side of the plate-like shield portion 13. The plate-like exterior portion 21 is formed with the cut portions 25 for avoiding contact with the head portions 46 of the bolts 45. According to this configuration, fastening forces of the bolts 45 do not reach the plate-like exterior portion 21. Since the plate-like shield portion 13 is sandwiched between the accommodating member 1 and the head portions 46 of the bolts 45, the cover 11 can be reliably fixed to the accommodating member 1.

The cut portions 25 are formed only by cutting parts (four corners) of the outer peripheral edge part of the plate-like exterior portion 21. The outer peripheral edge part of the plate-like exterior portion 21 is overlapped on the entire region where the cut portions 25 are not formed, out of the outer peripheral edge part of the plate-like shield portion 13. According to this configuration, since a maximum area of the plate-like exterior portion 21 can be secured within a range in which the plate-like exterior portion 21 does not interfere with the head portions 46 of the bolts 45, the rigidity of the covering portion 28 obtained by the plate-like exterior portion 21 can be sufficiently enhanced.

The locking portions 26 of the plate-like exterior portion 21 are accommodated and retained in the locking holes 17 of the plate-like shield portion 13. According to this configuration, the plate-like shield portion 13 and the plate-like exterior portion 21 can be held in an overlapping state.

The plate-like shield portion 13 and the plate-like exterior portion 21 have a rectangular outer peripheral shape, and four corners in the rectangular plate-like shield portion 13 serve as the fixing portions 19 to the accommodating member 1. The locking holes 17 and the locking portions 26 are arranged on the diagonals L each connecting two diagonally located fixing portions 19. Since the fixing portions 19 are fixed to the accommodating member 1, parts along the diagonals L each connecting two diagonally located fixing portions 19, out of the plate-like shield portion 13, are difficult to deform. Therefore, if the plate-like exterior portion 21 is joined to the plate-like shield portion 13 on the diagonals L, the deformation of the plate-like exterior portion 21 can be effectively suppressed.

The plate-like electrically conductive member 12 includes the tubular connecting portion 18 projecting from the plate-like shield portion 13 and arranged along the inner peripheral surface of the holding portion 24. The connecting portion 18 and the cover-side outer conductor 33 are resiliently in contact. According to this configuration, the plate-like electrically conductive member 12 and the cover-side outer conductor 33 can be conductively connected even without complicating the shape of the cover-side outer conductor 33 of the cover-side shield connector 30.

Second Embodiment

Figure 6:
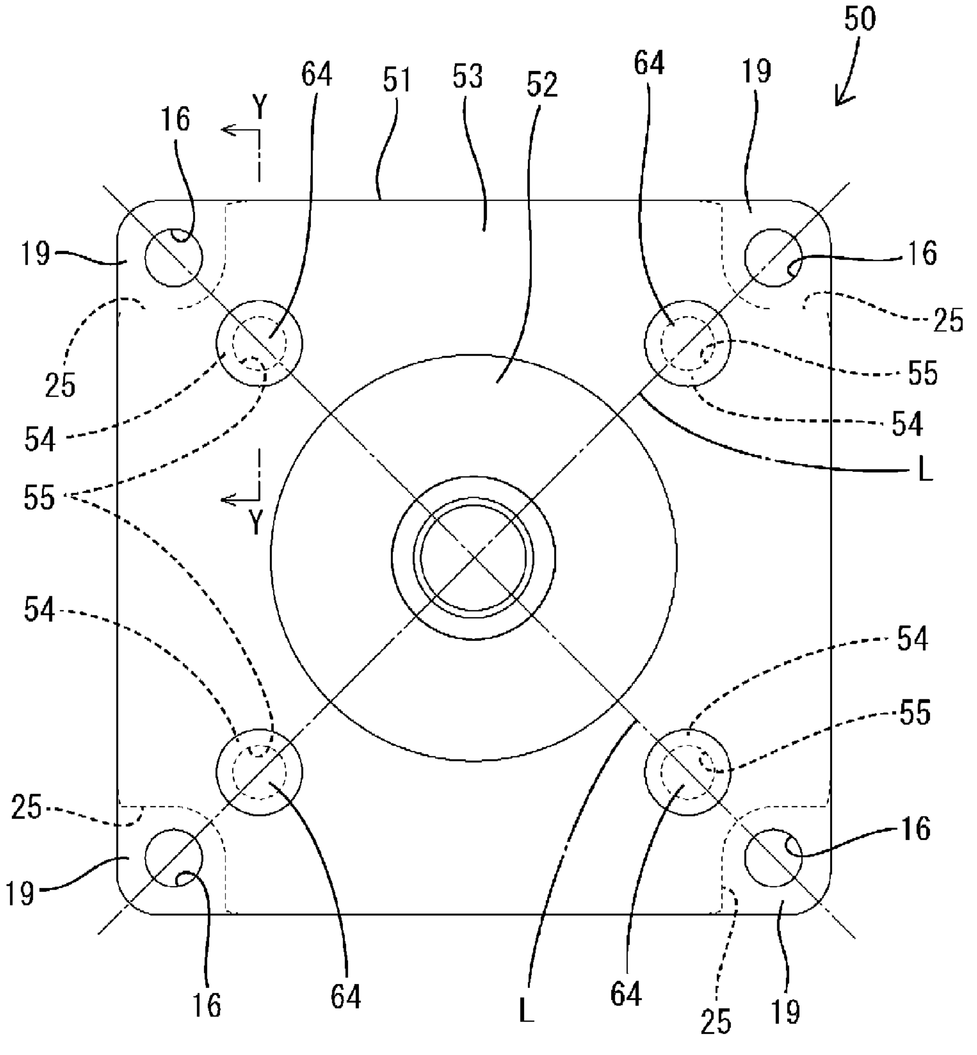
FIG. 6 is a front view of a case forming member of a second embodiment.

A second specific embodiment of the case forming member of the present disclosure is described with reference to FIGS. 6 and 7. A case forming member 50 of the second embodiment is different from the first embodiment in the configuration of a means for integrating a plate-like shield portion 52 of a plate-like electrically conductive member 51 and a plate-like exterior portion 61 of a housing 60. Since the other components are the same as in the first embodiment, the same components are denoted by the same reference signs and the structures, functions and effects thereof are not described.

Figure 7:
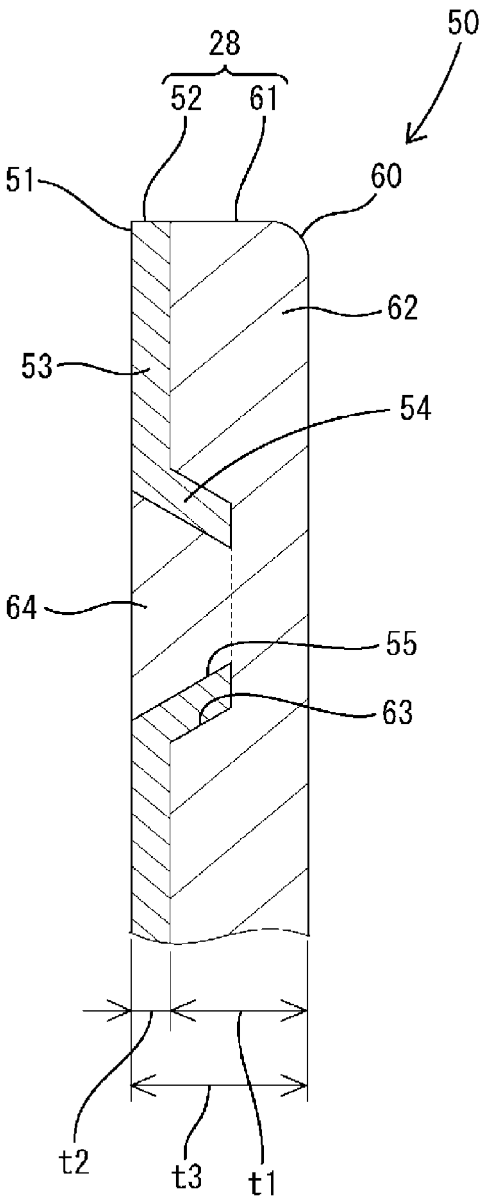
FIG. 7 is a section along Y-Y of FIG. 6.

As shown in FIG. 7, a planer shield portion 53 of the plate-like shield portion 52 is formed with tubular protrusions 54 having a truncated conical shape and projecting rearward. The tubular protrusion 54 is formed to gradually reduce a diameter toward the rear. A center hole of the tubular protrusion 54 functions as a locking hole 55. A projecting dimension of the tubular protrusion 54 from the planer shield portion 53 is smaller than a plate thickness t1 of a planar exterior portion 62 of the plate-like exterior portion 61. The tubular protrusion 54 is formed on the plate-like electrically conductive member 51 in a state before the plate-like electrically conductive member 51 and the housing 60 are integrated.

The planar exterior portion 62 is formed with recesses 63 having a truncated conical shape by recessing a front surface. A locking portion 64 projecting forward and having a truncated conical shape is formed in the recess 63. The locking portion 64 is gradually enlarged in diameter toward the front. The housing 60 is integrated with the plate-like electrically conductive member 51 by insert molding. Therefore, the recesses 63 and the locking portions 64 are also formed in an insert molding step.

With the plate-like electrically conductive member 51 and the housing 60 integrated, the tubular protrusions 54 are embedded in the plate-like exterior portion 61 and the tubular protrusions 54 bite in the plate-like exterior portion 61. In particular, the tubular protrusions 54 are accommodated in the recesses 63 while being held in close contact with the recesses 63, and the locking portions 64 are accommodated in the locking holes 55 of the tubular protrusions 54 while being held in close contact with the locking holes 55. In other words, the tubular protrusions 54 are sandwiched between the recesses 63 and the locking portions 64. The locking holes 55 of the tubular protrusions 54 projecting rearward are shaped to gradually reduce an inner diameter toward the rear, and the locking portions 64 accommodated in the locking holes 55 are shaped to gradually increase an outer diameter toward the front. Therefore, the inner peripheral surfaces of the tubular protrusions 54 and the outer peripheral surfaces of the locking portions 64 are caught by each other, thereby preventing the separation of the plate-like shield portion 52 and the plate-like exterior portion 61 in the front-rear direction. The front surfaces of the locking portions 64 are exposed on the front surface of the planer shield portion 53 and flush and continuous with the front surface of the planer shield portion 53.

Four corners of the rectangular plate-like shield portion 52 serve as fixing portions 19 for fixing the plate-like electrically conductive member 51 to an accommodating member. The locking holes 55 and the locking portions 64 are arranged on diagonals L each connecting two diagonally located fixing portions 19. Parts along the diagonals L each connecting two diagonally located fixing portions 19, out of the plate-like shield portion 52, are difficult to deform. Therefore, if the plate-like exterior portion 61 is joined to the plate-like shield portion 52 on the diagonals L, the deformation of the plate-like exterior portion 61 can be effectively suppressed.

Since the locking portions 64 of the plate-like exterior portion 61 are accommodated and retained in the locking holes 55 of the plate-like shield portion 52, the plate-like shield portion 52 and the plate-like exterior portion 61 can be held in an overlapping state. The plate-like shield portion 52 is formed with the tubular protrusions 54 projecting toward the plate-like exterior portion 61, and center holes of the tubular protrusions 54 function as the locking holes 55. According to this configuration, since the tubular protrusions 54 bite into the inside of the plate-like exterior portion 61, the plate-like shield portion 52 and the plate-like exterior portion 61 can be more reliably held in the overlapping state.

Other Embodiments

The present invention is not limited to the above described and illustrated embodiments, but is represented by claims. The present invention is intended to include all changes in the scope of claims and in the meaning and scope of equivalents and also include the following embodiments.

Although the plate-like shield portion is fixed to the accommodating member by screwing the bolts passed through the plate-like shield portion into the internally threaded holes of the accommodating member in the above first and second embodiments, the bolts may be passed through mounting holes of the accommodating member without being screwed and nuts may be screwed and fastened to tip parts of the bolts as a means for fixing the plate-like shield portion to the accommodating member. In this case, the bolts may be passed through the plate-like shield portion and the accommodating member from the side of the plate-like shield portion or may be passed through the accommodating member and the plate-like shield portion from the side of the accommodating member.

Although the internally threaded holes, the through holes and the cut portions are formed at four corners of a square shape in a back view in the above first and second embodiments, the internally threaded holes, the through holes and the cut portions may be arranged at locations other than the four corners.

Although the plate-like shield portion is mounted on the accommodating member by the bolts in the above first and second embodiments, the plate-like shield portion may be mounted on the accommodating member by passing externally threaded portions projecting from the accommodating member through the plate-like shield portion and fastening the externally threaded portions with nuts or by welding or the like.

Although the entire region where the cut portions are not formed, out of the outer peripheral edge part of the plate-like shield portion, is covered by the outer peripheral edge part of the plate-like exterior portion in the above first and second embodiments, the region where the cut portions are not formed, out of the outer peripheral edge part of the plate-like shield portion, may be partially exposed without being covered by the outer peripheral edge part of the plate-like exterior portion.

Although the locking holes and the projections are arranged on the diagonals each connecting two fixing portions in the above first and second embodiments, the locking holes and the projections may be arranged at positions deviated from the diagonals each connecting the two fixing portions.

Although the connecting portion of the plate-like electrically conductive member contacts the outer peripheral surface of the outer conductor of the cover-side shield connector in the above first and second embodiments, the connecting portion may contact the inner peripheral surface of the outer conductor or may contact a contact piece projecting outwardly of the holding portion from the outer conductor.

Although the projections projecting from the plate-like exterior portion are retained by being press-fit into the locking holes of the plate-like shield portion and plastically deformed as a means for holding the plate-like shield portion and the plate-like exterior portion in the overlapping state in the above first embodiment, the projections of the plate-like exterior portion may be retained only by being press-fit into the locking holes of the plate-like shield portion.

Although the projections are retained in a state projecting from the front surface of the plate-like shield portion in the above first embodiment, the projections may be retained without projecting from the front surface of the plate-like shield portion.

Although the projections are retained without projecting from the front surface of the plate-like shield portion in the above second embodiment, the projections may be retained in a state projecting from the front surface of the plate-like shield portion.

Although the tubular protrusions of the plate-like shield portion bite into the inside of the plate-like exterior portion in the above second embodiment, the plate-like shield portion may not include the tubular protrusions configured to bite into the inside of the plate-like exterior portion.

LIST OF REFERENCE NUMERALS

1 . . . accommodating member
2 . . . shield case
3 . . . lens
4 . . . circuit board
5 . . . imaging element
6 . . . adapter
7 . . . camera device
8 . . . opening
9 . . . internally threaded hole
10 . . . case forming member
11 . . . cover
12 . . . plate-like electrically conductive member
13 . . . plate-like shield portion
14 . . . planar shield portion
15 . . . tapered shield portion
16 . . . through hole
17 . . . locking hole
18 . . . connecting portion
19 . . . fixing portion
20 . . . housing
21 . . . plate-like exterior portion
22 . . . planar exterior portion
23 . . . tapered exterior portion
24 . . . holding portion
25 . . . cut portion
26 . . . locking portion
27 . . . retaining portion
28 . . . covering portion
30 . . . cover-side shield connector (shield connector)
31 . . . cover-side inner conductor
32 . . . cover-side dielectric
33 . . . cover-side outer conductor (outer conductor)
35 . . . board-side shield connector (shield connector)
36 . . . board-side inner conductor
37 . . . board-side dielectric
38 . . . board-side outer conductor
40 . . . movable-side inner conductor
41 . . . movable-side dielectric
42 . . . movable-side outer conductor
45 . . . bolt
46 . . . head portion
47 . . . externally threaded portion
50 . . . case forming member
51 . . . plate-like electrically conductive member
52 . . . plate-like shield portion
53 . . . planar shield portion
54 . . . tubular protrusion
55 . . . locking hole
60 . . . housing
61 . . . plate-like exterior portion
62 . . . planar exterior portion
63 . . . recess
64 . . . locking portion
L . . . diagonal
t1 . . . plate thickness of plate-like exterior portion
t2 . . . plate thickness of plate-like shield portion
t3 . . . thickness of covering portion

What is claimed is:

1. A case forming member for forming a shield case by being conductively mounted on an opening of a box-shaped accommodating member made of metal, comprising:
a shield connector including an outer conductor; and
a cover for covering the opening,
the cover being configured by uniting a plate-like electrically conductive member made of metal and a housing made of synthetic resin,
the plate-like electrically conductive member including
a plate-like shield portion fixable to the accommodating member to cover the opening and
a connecting portion having a tubular shape and projecting coaxially rearward from a central part of the plate-like shield portion, the connecting portion and the outer conductor configured to be electrically connected by being resiliently in contact with each other,
the housing including a holding portion for holding the shield connector and a plate-like exterior portion to be overlapped on an outer surface of the plate-like shield portion, and
a plate thickness of the plate-like exterior portion being larger than a plate thickness of the plate-like shield portion in a covering portion, the plate-like shield portion and the plate-like exterior portion overlapping in the covering portion.

2. The case forming member of claim 1, wherein:
the plate-like shield portion is fixed to the accommodating member by a bolt passed through the plate-like shield portion from an outer surface side of the plate-like shield portion, and
the plate-like exterior portion is formed with a cut portion for avoiding contact with a head portion of the bolt.

3. The case forming member of claim 2, wherein:

the cut portion is formed by cutting only a part of an outer peripheral edge part of the plate-like exterior portion, and the outer peripheral edge part of the plate-like exterior portion is overlapped on an entire region where the cut portion is not formed, out of an outer peripheral edge part of the plate-like shield portion.

4. The case forming member of claim 1, wherein a projection of the plate-like exterior portion is accommodated and retained in a locking hole of the plate-like shield portion.

5. The case forming member of claim 4, wherein:

the plate-like shield portion is formed with a tubular protrusion projecting toward the plate-like exterior portion, and a center hole of the tubular protrusion functions as the locking hole.

6. The case forming member of claim 4, wherein:

the plate-like shield portion and the plate-like exterior portion are rectangular, four corners of the rectangular plate-like shield portion serve as fixing portions to the accommodating member, and the locking hole and the projection are arranged on a diagonal connecting two diagonally located fixing portions.

7. The case forming member of claim 1, wherein the connecting portion is arranged along an inner peripheral surface of the holding portion.

* * * * *